United States Patent
Malatesha et al.

(10) Patent No.: US 10,915,823 B2
(45) Date of Patent: *Feb. 9, 2021

(54) SYSTEM FOR AUTOMATIC CLASSIFICATION AND ROUTING

(71) Applicants: Rathnakara Malatesha, Sunnyvale, CA (US); Lana Wong, Randolph, NJ (US); Hiroshi Kitada, Tuckahoe, NJ (US)

(72) Inventors: Rathnakara Malatesha, Sunnyvale, CA (US); Lana Wong, Randolph, NJ (US); Hiroshi Kitada, Tuckahoe, NJ (US)

(73) Assignee: Ricoh Company, Ltd., Tokyo (JP)

(*) Notice: Subject to any disclaimer, the term of this patent is extended or adjusted under 35 U.S.C. 154(b) by 830 days.

This patent is subject to a terminal disclaimer.

(21) Appl. No.: 15/060,347

(22) Filed: Mar. 3, 2016

(65) Prior Publication Data

US 2017/0255876 A1   Sep. 7, 2017

(51) Int. Cl.
 *G06N 5/04* (2006.01)
 *H04L 29/08* (2006.01)
 *G06Q 10/00* (2012.01)
 *G06Q 10/10* (2012.01)

(52) U.S. Cl.
 CPC .............. *G06N 5/04* (2013.01); *G06Q 10/00* (2013.01); *G06Q 10/10* (2013.01); *H04L 67/327* (2013.01)

(58) Field of Classification Search
 None
 See application file for complete search history.

(56) References Cited

U.S. PATENT DOCUMENTS

| | | | |
|---|---|---|---|
| 6,182,059 B1 * | 1/2001 | Angotti | G06N 5/04 706/45 |
| 6,594,351 B1 | 7/2003 | Bhogal | |
| 6,850,908 B1 | 2/2005 | Smith, II | |

(Continued)

OTHER PUBLICATIONS

Wen NPL 2002: Wen et al., Query Clustering Using User Logs, ACM Transactions on Information Systems vol. 20, No. 1 (2002) at pp. 59-81 (Year: 2002).*

(Continued)

*Primary Examiner* — Li Wu Chang
(74) *Attorney, Agent, or Firm* — Hickman Palermo Becker Bingham LLP; Edward A. Becker

(57) ABSTRACT

A request classifier service implemented on a server computer receives an input request from a client device. The request classifier service accesses classification data from a knowledge repository. The knowledge repository includes one or more defined input requests mapped to one or more classification types. The request classifier service determines confidence values for the one or more defined input requests. The confidence values represent a relative match score between the input request from the client device and each of the one or more defined input requests. The request classifier service sends classification types to a processing service implemented on the server computer. The processing service determines a process response type for the input request based upon the one or more classification types. The processing logic routes the process response type and the input request to a destination mapped to the process response type.

20 Claims, 6 Drawing Sheets

(56) References Cited

U.S. PATENT DOCUMENTS

| | | | |
|---|---|---|---|
| 7,512,580 B2* | 3/2009 | Ronnewinkel | G06F 17/30707 706/20 |
| 7,561,734 B1 | 7/2009 | Wnek | |
| 7,900,146 B2 | 3/2011 | Kozuka | |
| 2002/0090964 A1* | 7/2002 | Harder | H04M 3/5158 455/466 |
| 2003/0120593 A1 | 6/2003 | Bansal | |
| 2005/0004885 A1 | 1/2005 | Pandian | |
| 2005/0209867 A1 | 9/2005 | Diesch | |
| 2005/0210048 A1 | 9/2005 | Beres | |
| 2006/0013367 A1* | 1/2006 | Sawyer | H04L 51/14 379/88.01 |
| 2006/0063538 A1* | 3/2006 | Ishii | H04W 4/029 455/456.2 |
| 2006/0217959 A1 | 9/2006 | Saito | |
| 2007/0150387 A1 | 6/2007 | Seubert | |
| 2007/0168382 A1 | 7/2007 | Tillberg | |
| 2007/0217715 A1 | 9/2007 | Newcomer | |
| 2008/0147790 A1 | 6/2008 | Malaney | |
| 2008/0239365 A1 | 10/2008 | Salgado | |
| 2009/0138466 A1 | 5/2009 | Henry | |
| 2009/0222490 A1 | 9/2009 | Kemp | |
| 2009/0228777 A1 | 9/2009 | Henry | |
| 2009/0296166 A1 | 12/2009 | Schrichte | |
| 2010/0046015 A1 | 2/2010 | Whittle | |
| 2010/0229246 A1 | 9/2010 | Warrington | |
| 2010/0241603 A1 | 9/2010 | Voskuil | |
| 2010/0245938 A1 | 9/2010 | Coley | |
| 2010/0318538 A1 | 12/2010 | Wyman | |
| 2012/0204103 A1 | 8/2012 | Stevens | |
| 2014/0229408 A1* | 8/2014 | Vijayaraghavan | G06N 99/005 706/12 |
| 2015/0278699 A1 | 10/2015 | Danielsson | |
| 2016/0049010 A1 | 2/2016 | Hinski | |
| 2016/0122148 A1 | 5/2016 | Westcott | |
| 2016/0125680 A1 | 5/2016 | White | |
| 2016/0173364 A1* | 6/2016 | Pitio | G06F 21/6227 709/226 |
| 2016/0350674 A1* | 12/2016 | Midboe | G06N 99/005 |
| 2017/0063762 A1* | 3/2017 | Machol | H04L 51/18 |
| 2017/0103230 A1 | 4/2017 | O'Brien | |
| 2017/0142274 A1 | 5/2017 | Koyanagi | |
| 2017/0220535 A1 | 8/2017 | Olsen | |
| 2017/0255680 A1 | 9/2017 | Malatesha et al. | |
| 2017/0300821 A1 | 10/2017 | Hong et al. | |

OTHER PUBLICATIONS

Kriegsman & Barletta, Building a Case-Based Help Desk Application, IEEE Expert at pp. 18-26 (Year: 1993).*

Hong, U.S. Appl. No. 15/132,064, filed Apr. 18, 2016, Office Action, dated Oct. 5, 2017.

Malatesha, U.S. Appl. No. 15/060,352, filed Mar. 3, 2016, Office Action, dated May 10, 2018.

Hong, U.S. Appl. No. 15/132,064, filed Apr. 18, 2018, Final Office Action, dated May 17, 2018.

Malatesha, U.S. Appl. No. 15/060,352, filed Mar. 3, 2016, Notice of Allowance, dated Oct. 1, 2018.

Hong, U.S. Appl. No. 15/132,064, filed Apr. 18, 2016, Office Action, dated Oct. 2, 2018.

Hong, U.S. Appl. No. 15/132,064, filed Apr. 18, 2016, Notice of Allowance, dated Jun. 14, 2019.

Hong, U.S. Appl. No. 15/132,064, filed Apr. 18, 2016, Final Office Action, dated Apr. 4, 2019.

* cited by examiner

FIG. 3

| Defined Input Request | Classification Type |
|---|---|
| How to change font? | IWB Appliance Display |
| How to change size of the text? | IWB Appliance Display |
| How to recognize OCR? | IWB Appliance Display |
| How to change the text color? | IWB Appliance Display |
| IWB Appliance display not working. | IWB Appliance Support |
| IWB Appliance not booting. | IWB Appliance Support |
| How to start virtual receptionist? | Virtual Reception Kiosk |
| How many concurrent connections VRK supports? | Virtual Reception Kiosk |
| IWB Appliance in Boston not powering up. | IWB Appliance Tech Support Boston |
| IWB Appliance in Tokyo not powering up. | IWB Appliance Tech Support Japan |
| IWB Appliance in Campbell not powering up. | IWB Appliance Tech Support Bay Area |
| How to switch on projector from Android App? | Android App |
| How to connect iPad to whiteboard? | Network |
| How much 55 inch whiteboard costs? | Business |
| Marketing contacts for whiteboard | Marketing |
| How to request for whiteboard demo? | Demo |
| How to go to IWB user mode? | IWB Appliance |

FIG. 4A

Query: "How to start virtual receptionist?"
Classifier Output (JSON format):

```
{
  "text": " How to start virtual receptionist?",
  "top_class": "Virtual Reception Kiosk",
  "classes": [
    {
      "class_name": "Virtual Reception Kiosk",
      "confidence": 0.9069703276201039
    },
    {
      "class_name": "Marketing",
      "confidence": 0.020824570715905946
    },
    {
      "class_name": "Android App",
      "confidence": 0.010763899769405793
    },
    {
      "class_name": "IWB Appliance",
      "confidence": 0.007352013197114865
    },
  ]
}
```

FIG. 4B

Query: "IWB Appliance in Campbell not powering up."
Classifier Output (JSON format):

```
{
  "text": "IWB Appliance in Campbell not powering up.",
  "top_class": "IWB Appliance Tech Support Bay Area",
  "classes": [
    {
      "class_name": "IWB Appliance Tech Support Bay Area",
      "confidence": 0.9069703276201039
    },
    {
      "class_name": " IWB Appliance Support",
      "confidence": 0.020824570715905946
    },
    {
      "class_name": "IWB Appliance",
      "confidence": 0.010763899769405793
    },
    {
      "class_name": "IWB Appliance Display",
      "confidence": 0.007352013197114865
    },
  ]
}
```

SYSTEM FOR AUTOMATIC CLASSIFICATION AND ROUTING

RELATED APPLICATION DATA

This application is related to U.S. patent application Ser. No. 15/060,352 entitled "An Intelligent System For Automatic Routing And Classification", filed Mar. 3, 2016, the contents all of which are incorporated by reference in their entirety for all purposes as if fully set forth herein.

FIELD OF THE INVENTION

Embodiments relate generally to routing classified requests to the appropriate destination.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Users of client devices, such as printers, scanners, multi-function peripherals (MFPs), Interactive Whiteboard (IWB) Appliances, projectors, etc., often have questions about the operation of these devices. For example, users may have questions about particular features or the meaning of error codes. Some of these devices allow a user to use the control panel of the device to access a user manual or frequently asked questions (FAQ) document to obtain an answer to a question or to obtain information about a feature of the device. These devices may also allow a user to enter a query to access information pertaining to a particular device. Queries may range from accessing user manuals and FAQs, to entering support tickets for product defects, querying available products based on user need, and querying contact information for an appropriate support person who can assist the user.

One of the issues with these approaches is that the information provided to a user is often static and not updated. For example, user manuals and FAQs may be prepared prior to a product release and may rarely be updated, even when the information is available via the Internet. Therefore information provided may be outdated and may not match what the user is trying to query. The user may then be forced to manually query multiple resources or contact a general support person in order to figure out which resources will sufficiently assist the user. Manual user queries take valuable time away from the user experience and may frustrate the user when trying to solve an issue. Additionally, contacting a general support person may lead to unnecessary generation of support tickets and involve multiple layers of support in order to route the question or problem to the correct destination. Product queries that are based upon static information may also lead to the user receiving outdated product information that may result in the user purchasing the incorrect product for their needs. Retailers of products are also negatively impacted as the retailers may lose revenue if incorrect or outdated products are offered to users rather than offering the appropriate products to users.

SUMMARY

An apparatus includes one or more processors, one or more memories communicatively coupled to the one or more processors and a request classifier service executing on the apparatus. The request classifier service receives an input request from a client device and in response to receiving an input request, the classifier service accesses classification data from a knowledge repository. The knowledge repository includes classification data from one or more defined input requests mapped to one or more classification types. The request classifier determines confidence values for each of the one or more classification types, where the confidence value represents a relative match score between the input request from the client device and each of the one or more defined input requests. The request classifier sends one or more classification types from the one or more defined input requests mapped to the one or more classification types to a processing service executing on the apparatus. The processing service determines a process response type based on the one or more classification types received from the request classifier service. The processing service routes the process response type and the input request to a destination mapped to the process response type.

BRIEF DESCRIPTION OF THE DRAWINGS

In the figures of the accompanying drawings like reference numerals refer to similar elements.

FIG. 3 is example classification mapping data for defined input requests.

FIGS. 4A and 4B are example output from the request classifier that represents matching classification types.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

1. OVERVIEW
2. STRUCTURAL OVERVIEW
3. REQUEST CLASSIFICATION AND ROUTING SYSTEM
   3.1. KNOWLEDGE BASE
   3.2. REQUEST CLASSIFICATION SERVICE
   3.3. PROCESSING SERVICE
4. INPUT REQUEST EXAMPLES
5. IMPLEMENTATION MECHANISMS

1. Overview

A request classifier service implemented on a server computer receives an input request from a client device. The request classifier service accesses classification data from a knowledge repository. The knowledge repository includes one or more defined input requests mapped to one or more classification types. The request classifier service determines confidence values for each of the one or more defined input requests mapped to the one or more classification types. The confidence values represent a relative match score between the input request from the client device and each of the one or more defined input requests. The request classifier service sends one or more classification types to processing logic implemented on the server computer. The processing logic determines a process response type for the input request from the client device based upon the one or more classification types. The processing logic routes the process response type and the input request from the client device to a destination mapped to the process response type.

2. Structural Overview

Figure 1:
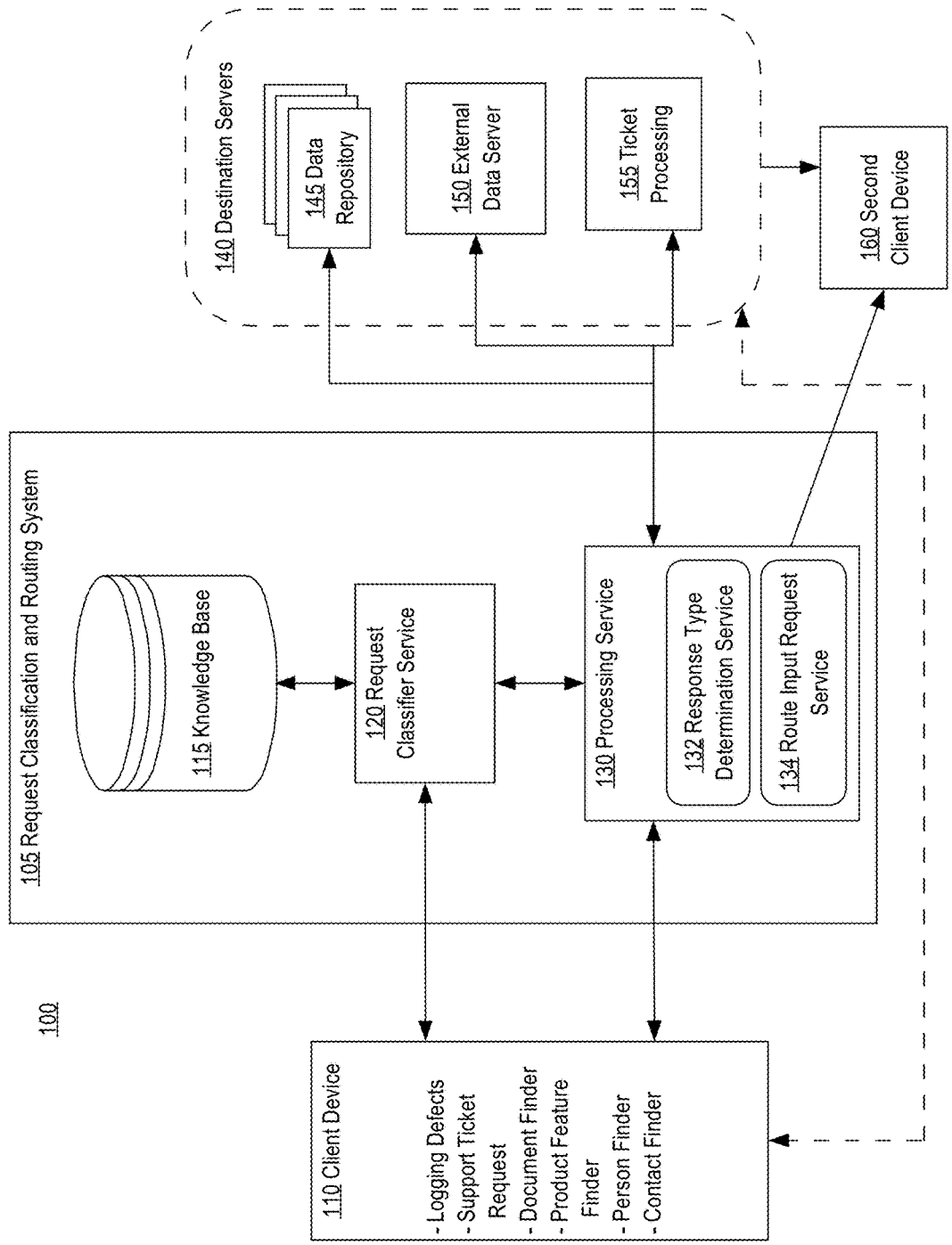
FIG. 1 is a block diagram that depicts an arrangement for classifying and routing input requests to a destination.

FIG. 1 is a block diagram that depicts an arrangement 100 for classifying and routing input requests to a destination. Arrangement 100 includes a client device 110, a request classification and routing system 105, destination servers 140, and a second client device 160. The client device 110, the request classification and routing system 105, the destination servers 140, and the second client device 160 may be communicatively coupled via one or more networks including, for example one or more wired or wireless networks, such as local area networks (LANs), wide area networks (WANs), the Internet, as well as one or more direct connections. In addition, although the elements of FIG. 1 are depicted and described herein as being separate, this is done for explanation purposes only and the elements of FIG. 1 may be combined in any manner. For example, the request classification and routing system 105 may be hosted and managed on the same server as the destination servers 140. Alternatively, elements of the request classification and routing system 105 may be implemented on multiple separate servers that are communicatively coupled via one or more networks. Arrangement 100 is not limited the particular elements depicted in FIG. 1 and may include fewer or additional elements depending upon a particular implementation.

Client device 110 may be implemented by devices such as an Interactive Whiteboard (IWB) Appliance, a projector device, a smart phone, a tablet computer, a desktop computer and a laptop computer. Embodiments are not limited to any particular type of client device. The client device 110 may be configured to communicate input requests to the request classification and routing system 105. An input request may be defined as either a request for information or a request to perform a specific action. In an embodiment, an input request that specifies a request for information may be defined as a query request which may result in a query result set of information related to a specific product, specific feature within a product, or troubleshooting information related to a product. In an embodiment the query request may include a request for information related to personnel contact information, personnel department information related to a product, or personnel contact information related to a desired subject. In an embodiment, an input request that specifies a specific action may include actions such as generating a support ticket related to a particular problem, logging a detect discovered on a particular product, and generating a task to be allocated to a development group or employee.

In an embodiment, the request classification and routing system 105 is configured to receive a user input request from the client device 110 and classify the user input request using defined input requests that have been mapped to a particular classification. After classifying the user input request from the client device 110, the request classification and routing system 105 then routes the user input request to the appropriate destination server for further processing. FIG. 1 depicts an embodiment of the request classification and routing system 105. The request classification and routing system 105 is implemented using one or more computer programs or other software elements that are loaded into and executed using one or more general-purpose computers, logic implemented in field programmable gate arrays (FPGAs) of application-specific integrated circuits (ASICs). The request classification and routing system 105 includes a knowledge base 115, a request classifier service 120, and a processing service 130.

In an embodiment, the knowledge base 115 is a data repository that contains classification data for one or more defined input requests that are mapped to one or more classification types. Examples of defined input requests include, without limitation, questions to particular product features that are mapped to a classification type for that particular product, questions related to employee management that are mapped to a classification type for specific personnel departments, requests to log defects related to a particular product that are mapped to a classification type for defect logging. For example, the knowledge base may include defined questions for the IWB Appliance including "How to change the font?" This defined input request may be mapped to the classification type "IWB Appliance", which may represent IWB Appliance product features questions. Another example of a defined input request is "IWB Appliance not booting" which, may be mapped to the classification type "IWB Appliance support ticket" that indicates that this input request is the type that should be routed to the IWB Appliance support group.

In an embodiment, the knowledge base 115 may be configured to the specific needs of intended users. For example, if the intended user base requires information and support related to product features, then the knowledge base 115 may be configured with defined input requests related to product features and to routing support requests to defined support groups. If the intended user base requires information related to a product repository of available products for purchase, then the knowledge base 115 may be configured with defined input requests intended to describe available products for the user. The knowledge base 115 uses the provided defined input requests as a training set. The training set is used to identify various specific patterns and attributes that are then used to match specific defined input requests to the incoming user requests provided by the client device 110.

In an embodiment, the request classifier service 120 is implemented using one or more programs executing on one or more computers within the request classification and routing system 105. The request classifier service 120 is configured or programmed to receive the user input request from the client device 110 and to match a classification to the user input request using the defined input requests stored in the knowledge base 115. After matching one or more classification types to the user input request from the client device 110, the request classifier service 120 is configured or implemented to send the user input request and the one or more matching classification types to the processing service 130.

In an embodiment, the processing service 130 is implemented using one or more programs on one or more computers within the request classification and routing system 105. The processing service 130 is configured or programmed to receive, from the request classifier service 120, the user input request and the one or more matching classification types and route the user input request to the appropriate destination server based on the one or more matching classification types. In an embodiment, the processing service 130 may implement one or more sub-services programmed or configured to determine and route the user input request based upon the matching classification types. FIG. 1 depicts an embodiment of the processing service 130 that includes two sub-services, response type determination service 132 and route input request service 134. Response type determination service 132 may be programmed or configured to determine whether the user input request type is either a request for information or a request to perform a specific action. Depending on the type of user input request, the response type determination service 132 may determine the appropriate destination server based upon the request type and one or more matching classification for the user input request. In an embodiment, the route input request service 134 may be configured or programmed to determine the routing path to send the user input request to a destination server determined by the request type determination service 132.

FIG. 1 depicts multiple different destination servers as destination servers 140, which represents the different types of destination servers configured or programmed to receive the user input request originating from the client device 110 and to process the user input request based on the type of destination server. The depicted embodiment in FIG. 1 shows multiple different destination servers in destination servers 140 as including a data repository 145, an external data server 150, and a ticket processing server 155. Other embodiments of destination servers 140 may include other destination servers configured to handle tasks and requests not covered by the destination servers depicted in destination servers 140.

In an embodiment, data repository 145 may be defined as a data repository server that stores information related to feature specifications for one or more products or answers to frequently asked questions related to one or more products. In another embodiment, the data repository 145 may store personnel and contact information for employees and department contacts for the purpose of finding contact information for employees to assist with a question or request. In an embodiment, the data repository 145 may implement a search engine configured to retrieve appropriate information related to the user input request and the one or more matching classification types.

In an embodiment, external data server 150 may be described as a project management server configured to track and manage ongoing development and support projects related to one or more products. For example, the external data server 150 may be used to manage the current development cycle of the operating system running on IWB Appliance products.

In an embodiment, ticket processing server 155 may be defined as a processing server that creates support tickets and notifies the appropriate support engineer of the newly created ticket. For example, if the user input request from the client device 110 is a request to create a support ticket to fix an issue on the IWB Appliance, then the ticket processing server 155 may process the input request and create the appropriate support ticket based on the user input request.

FIG. 1 also depicts a second client device 160 that may be configured to receive a notification from the processing service 130 when the user input request from the client device 110 has been successfully routed to the appropriate destination server. In another embodiment, the second client device 160 may be programmed or configured to receive a result set from one of the destination servers directly or the result set via the processing service 130. The result set may refer to requested information from a destination server that is in response to the user input request from the client device 110. For example, if the user input request was a request for directions on how to adjust the font on the IWB Appliance, then the result set may include information or links to information on how to adjust the font on the IWB Appliance.

3. Request Classification and Routing System

Figure 2:
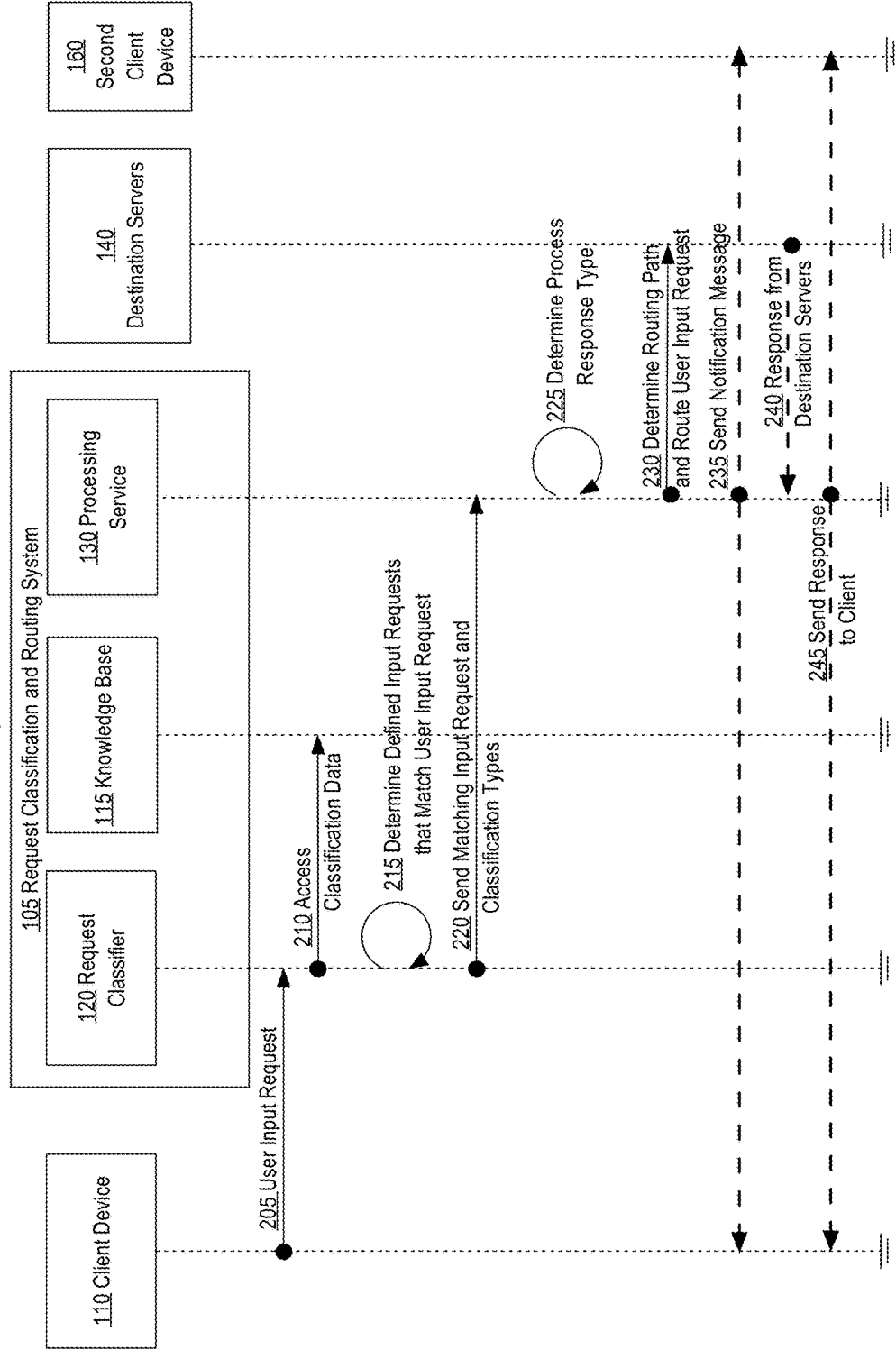
FIG. 2 is a flow diagram that depicts an example method for classifying and routing a user input request to the appropriate destination.

FIG. 2 is a flow diagram that depicts an example method for classifying and routing a user input request to the appropriate destination. FIG. 2 contains client device 110, request classification and routing system 105, request classifier 120, knowledge base 115, processing service 130, destination servers 140, and second mobile device 160. Destination servers 140 may comprise data repository 145, external data server 150, ticket processing server 155, or any combination thereof. The various systems of FIG. 2 may interact over a network shown in FIG. 1.

At step 205, the request classification and routing system 105 receives a user input request from the client device 110. In an embodiment, the user input request from the client device 110 may be in the form of a request for particular information (query request) or a request to perform an action. Embodiments of a request for information may include, but are not limited to: a request for instructions on a particular product feature related to a specific product a user may be using; a request for troubleshooting information related to a specific product feature; a request for available products that match the user's search criteria such as price; a request for contact information related to a contact person in a specific department or organization; and a request for a list of resources based upon matching skillsets of available personnel. For example, the input request from the client device 110 may state "Top 3 IWB Appliance models priced less than $7000". In this example the request for information is a request for particular products models of IWB Appliances that match the user's criteria of being less than $7000.

Embodiments of a request to perform an action may include, but are not limited to: a request to generate a support ticket to address a particular defect on a product; a request to log a defect entry related to development of a particular product; a request to allocate a project and/or task to a particular person or group; and a request to generate an action item to a project, department, or group. For example, the input request from the client device 110 may state "IWB Appliance not booting". In this example the request to perform an action is a request to generate a support ticket that describes the problem as being that the user's IWB Appliance is not booting up. Embodiments of different input request types are described in detail in the INPUT REQUEST EXAMPLES section herein.

3.1. Knowledge Base

Referring to FIG. 2, at step 210 the request classifier 120 accesses classification data from the knowledge base 115. In an embodiment, the knowledge base 115 may implement classification mapping between one or more defined input requests and one or more classification types. For example, FIG. 3 may represent classification mapping data for defined input requests that have been loaded into the knowledge base 115. Column 305 may represent the defined input request and column 310 may represent the classification type for the defined input request. For example defined input request 315 is "How to change font?" and is mapped to classification type 320 (IWB Appliance). This classification mapping data may then be used to map a received user input request from the client device 110 to a certain classification if the user input request matches one of the defined input requests.

3.2. Request Classifier

Referring back to FIG. 2, at step 215, the request classifier 120 determines which defined input requests best match the user input request from the client device 110. In an embodiment the request classifier 120 determines the best matching defined input requests by calculating a match score between the user input request from the client device 110 and each of the defined input requests. A match score may be represented as a particular confidence value, where the confidence value is a value between 0 and 1, where a confidence value of 0 represents a lowest level of confidence and a confidence value of 1 represents a highest level of confidence. In an embodiment, determining the confidence value for the defined input requests with respect to a user input request may be based on deep learning techniques or other heuristics that may vary depending upon a particular implementation. The confidence scores may be used to select the best matching defined input requests. For example, the N number of defined input requests with the highest confidence values may be selected. As another example, the N number of defined input requests having a confidence value that exceeds a specified threshold may be selected.

In other embodiments, confidence values may be configured on scales other than 0 to 1. For example, confidence values may be represent values on a 0 to 100 scale, 1 to 100 scale, 1 to 1000 scale, or any other defined scale.

Deep learning is a method of machine learning that is based on a set of algorithms that attempt to model high-level abstractions in data by using multiple processing layers with complex structures. In an embodiment, the defined input requests stored in the knowledge base 115 are analyzed and modeled based on their natural language structure to discover contextually relevant properties that may be used to match a particular defined input request to the user input request. Additionally, new patterns may be modeled using analytics based on past user input requests. For example, historical user input requests for the client device 110 may be used to update contextually relevant properties of the defined input requests.

At step 220, the request classifier 120 sends to the processing service 130 a set of matching classification types that map to the set of best matching defined input requests. FIG. 4A depicts example output from the request classifier 120 that is sent to the processing service 130. In this example, the user input request from the client device 110 received (step 205) is "How to start virtual receptionist." Then at steps 210 and 215, the request classifier 120 accesses the knowledge base 115 for the defined input requests and determines which defined input requests best match the user input request by determining confidence values for each of the defined input requests with respect to the user input request. FIG. 4A represents output created and sent to the processing service 130 in JavaScript Object Notation (JSON) format for purposes of explanation, but embodiments are not limited to the output generated by the request classifier service 120 being in the JSON format. The JSON output includes the user input request, classification types associated with the matching defined user inputs, and the calculated confidence value associated with each matching classification type. The user input request is labeled as element "text". Classification types are labeled with element "class_name" and their corresponding confidence values are labeled with element "confidence". In the depicted embodiment, the top matching classification type is labeled as "top_class". In this example the top matching classification type is "Virtual Reception Kiosk".

In other embodiments, output sent by the request classifier 120 may include a set of top matching classification types labeled as "top_class". The set of top matching classification types may be configured as the top N matching classification types based upon confidence values. For example, if the request classifier 120 is configured to determine the top 3 matching classification types, then the output may identify these top 3 matching classification types by labeling them as "top_class".

3.3. Processing Service

In an embodiment, the processing service 130 may include two or more sub-services configured to determine the type of response that is required for the user input request and routing destinations for the user input request. The response type determination service 132 determines a process response type for the user input request. A process response type defines the type of action that needs to be taken in response to the user input request. For instance, if the response type determination service 132 determines that the user input request is a request to perform an action, then the response type determination service 132 would select the top classification type for routing to destination servers 140. By selecting only one classification type to route to a specific destination server, the processing service 130 only sends a single request to perform an action on one of the destination servers within the destination servers 140, thus avoiding the creation of unnecessary action requests.

If however, the response type determination service 132 determines that the user input request is a request for information, then the response type determination service 132 may determine that two or more matching classification types may be used to retrieve information. By doing so, the request for information may be requested against multiple servers within destination servers 140 in order to provide a robust result set that includes information from multiple sources.

Referring back to FIG. 2, at step 225, the response type determination service 132, within the processing service 130, determines the process response type for the user input request. In an embodiment, the response type determination service 132 may use the best matching classification types to determine whether the user input request is a request for a specific action or a request for information. For example, in FIG. 4A the top classification type, based on confidence values, is "Virtual Reception Kiosk". In this example, the response type determination service 132 may determine that the process response type is a request for information because the classification type "Virtual Reception Kiosk" refers to a classification type that is designated as an information resource. Therefore the response type determination service 132 may use the other top classification types as well, such as using the top three classification types.

In another embodiment, after the response type determination service 132 has determined that the process response type is a request for information, the response type determination service 132 may filter the remaining classification types to select only classification types that refer to requests for information. Additionally, the response type determination service 132 may be configured to only select additional classification types that have a confidence value above a configured threshold. Using the example in FIG. 4A, if the configured confidence value threshold is set at 0.85, then the response type determination service 132 would not select any other classification types since the other classification types, "Marketing", "Android App", and "IWB Appliance", have values of 0.02, 0.01, and 0.007 respectively.

FIG. 4B depicts example output from the request classifier 120, where the top classification type, "IWB Appliance Tech Support Bay Area", is a request for action. In this example, when the response type determination service 132 determines that the "IWB Appliance Tech Support Bay Area" is a request for action, then the response type determination service 132 will only select the top classification type for routing determination.

In an embodiment, the processing service 130 may include a sub-processing service called the route input request service 134 that is configured or programmed to determine the routing path for the user input request based upon the process response type determined and route the user input request to the appropriate destination. Referring back for FIG. 2, at step 230 the route input request service 134, within the processing service 130, determines the routing path and routes the user input request and the process response type to the appropriate destination within the destination servers 140. In an embodiment, the route input request service 134 may determine the routing path by accessing destination-mapping information, where destination servers are mapped to classification types. For example, the classification type "IWB Appliance Tech Support Bay Area" may be mapped to a ticket processing server 155. Additionally, the classification type may be used to further route, within the destination server, the user input request to the appropriate destination within the destination server. For example, the "IWB Appliance Tech Support Bay Area" classification type may be mapped to the ticket processing server 155 and then once received by the ticket processing server 155, the classification type is used to route the user input request to the specific message queue associated with the support group the supports the IWB Appliance products in the Bay Area.

In an embodiment, if the response type determination service 132 supplied multiple classification types, for a request for information user input request, then the route input request service 134 may be configured to access multiple destination-mapping information and route the user input request to multiple destination servers within destination servers 140.

In an embodiment, the route input request service 134 may be further configured to transform the user input request into a format that is compatible with the receiving destination server. For example, if the user input request is a request to create a support service ticket, then the route input request service 134 may transform the user input request into a format such as a incoming message for a support message queue on the ticket processing server 155. In another example, if the user input request is a request for information, then the route input request service 134 may transform the user input request into a database query that is compatible with the database implemented on the data repository server 145. Other embodiments of transforming the user input request into a format compatible with the receiving destination server may include, but are not limited to, creating a voice message that is the routed to the appropriate voicemail server, creating a SMS message that is routed to the appropriate telecom server, creating a database query that is specific to the database on the data repository 145, and creating multiple user formatted messages that are then routed to multiple specific servers within the destination servers 140.

Further embodiments of transforming the user input request include transforming the user input request into a task allocation entry that may be received by a project management server. For example, if the user input request is a request to assign a new project to the IWB Appliance display group, then the user input request may be formatted into a task allocation entry message that is received by the project management server. The project management server may be configured to consume the incoming message and create the appropriate new task. Other embodiments may also include formatting the user input request into an insert or update database operation that may be directly executed on an external server.

Optionally, the processing service 130 may be further configured to notify the client device 110 that the user input request has been routed to the appropriate destination server. Referring back to FIG. 2, step 235 depicts an optional notification step where the processing service 130 transmits a notification message to the client device 110. In an embodiment, the processing service 130 may transmit a notification message to one or more client devices associated with the user. Step 235 illustrates transmitting two notification messages, the first to the client device 110 and the second notification message to the second client device 160, where the second client device 160 is associated with the user. For example, the client device 110 may be the IWB Appliance where the user initiated the user input request. The second client device 160 may be a smartphone that is associated with the user. By sending a notification to the second client device 160, the user may be notified when the user input request is routed to the appropriate destination server even when the user is not actively using the original client device 110.

Additionally, at step 240 in FIG. 2, the processing service 130 may receive from the destination servers 140 a response to the user input request sent by the appropriate destination servers 130. In an embodiment, the response may include, but is not limited to, a result set of information that is in response to a query response type, or an acknowledgement that is in response to user input request for action. In the case of a query response type for information, the destination servers 140 may send a result set of information. For example, if the user response type sent was a request of "How to start virtual receptionist?" then the result set received from the destination servers 140 may include information with instructions and or other resources on how to start the virtual receptionist. In an embodiment, the information within the result set may be in the form of text detailing the steps that answer the user input request, web links with link to further information on how to answer the user input request, or attached files that contain information on how to answer the user input request.

In an embodiment, the response received by the processing service 130 may include an acknowledgement message in response to a user input request for a specific action to be performed. For example, if the user input request was "IWB Appliance in Campbell not powering up", where this user input request is associated with generating a support ticket, then the response received by the processing service 130 may be a acknowledgement message that an appropriate support ticket has been created within the ticket processing server 155.

At step 245, in response to receiving the response message from the destination servers 140, the processing service 130, is configured to send the response to the client device 110. In an embodiment, the processing service 130 may be configured or programmed to send the response message multiple client devices such as client device 110 and second client device 160. In yet another embodiment, the processing service 130 may be configured or programmed to format the response into client device specific format. For example, if the response message from the destination servers 140 is a result set of information and the second client device 160 is a smartphone, then the processing service 130 may format the response message into a mobile device format that is compatible with the second client device 160. In an embodiment, the processing service 130 may be configured to individually format response messages into different format that are specific to each client device associated with the user.

In an embodiment, if the processing service 130 receives multiple responses from multiple destination servers 140 for a single user input request, then the processing service may be configured or programmed to combine the multiple responses into a single response message that is then sent to the client device 110. For example, if the user input request was a query response type and was sent to multiple destination servers 140, then the processing service 130 may receive multiple responses in the form of result sets from the destination servers 140. In this scenario, the processing service 140 may combine and format the results into a single result set that is then sent to the client device 140.

In an alternative embodiment, the destination servers 140 may be configured or programmed to send the result set directly to the client device 110. In this scenario, the processing service 130 may be configured to send user and/or client device 110 information to the destination servers 140, at step 230. Optionally, the destination servers 140 may be configured to send the result set to both the client device 110, the second client device 160, and/or the processing service 130.

4. Input Request Examples

As discussed, the user input requests from the client device 110 may be a request for a specific action or a request for information. The requests for a specific action describe requests update or insert data onto a specific destination server. The requests for information describe querying one or more destination servers for specific information that answer a question the user may have.

4.1. Requests for Action

Examples of a request for action may include, but are not limited to, creating product support ticket, allocating new project tasks and/or updating existing project tasks, and logging defects to a product support queue.

An example of creating a support ticket includes a user using the client device 110 to send a user input request such as "IWB Appliance not booting" to the request classification and routing system 105. Within the request classification and routing system 105, the request classifier 120 may access the knowledge base 115 to determine which classification type matches the user input request based upon the defined input requests stored within the knowledge base 115. The request classifier 120 may then send the best matching classification types, with their confidence values to the processing service 130. In this example, the response type determination service 132 would determine that the response type is a request for a specific action. Then the route input request service 134 would retrieve the destination-mapping information associated with the top matching classification type. For example, if the top matching classification type is "IWB Appliance Tech Support Bay Area" and the top matching classification type is mapped to the ticket processing server 155, then the processing service 130 would send the user input request and the classification type to the ticket processing server 155. Since this is a request for action the processing service 130 would only send a single message to a single destination server, the ticket processing server 155. By sending the single message to the ticket processing server 155 with the correct classification type, the ticket processing server 155 is able to generate a sufficiently classified support ticket with enough detail such that manual intervention is not required for routing the user's support request.

In an embodiment, the ticket processing server 155 may be configured to receive messages in the form of incoming SMS, voice message or automated phone call, IVR request, email, online chat message or any other messaging protocol. Depending on how the ticket processing server 155 is configured, the ticket processing server 155 may then generate a support ticket and may notify the appropriate support engineer using the generated SMS, voice, or IVR message from the processing service 130.

In another example, the user input request may specify and/or represent a defect that needs to be logged within a defect tracking engine. In an embodiment, if the user wants to create a defect ticket for a particular defect that he may have found in the product, then the user may use the client device 110 to send a user input request to the request classification and routing system 105. As discussed above, the request classifier service 120 may access the knowledge base 115 to determine the appropriate classification type for the defect being reported. For example, if the user input request is "Lync module is not coming up in IWB Appliance beta" then the request classifier service 120 may determine that this user input request most closely matches the "IWB Appliance defect—Lync" classification type. The processing service 130 may then send the user input request and classification type to the appropriate destination server based on the destination-mapping. For example, the user input request may be sent to the ticket processing server 155. However unlike the previous example, the ticket processing server 155 may use the classification type to map this user input request into a defect message queue that may be routed to the IWB Appliance-Lync project group. Additionally, the processing service 130 may receive an acknowledgement that the IWB Appliance-Lync project group has received the user input and me forward that acknowledgement to the client device 110.

An example of project task allocation, the user input request from the client device 110 may include a user input request such as, "Create development task for IWB Appliance to iOS syncing—4 hours". In this example, the request classifier service 120 may determine based upon data in the knowledge base 115 that the user input request is a task allocation request specific to the IWB Appliance product. The processing service 130 may then determine the destination-mapping and send the user input request and the classification type to the appropriate destination servers 140. For example, the project development server may be external data server 150, where the external data server 150 manages and tracks existing development projects. In an embodiment, the external data server 150 may be configured to parse the user input request and create or update existing task for projects. For example, the "Create development task for IWB Appliance to iOS syncing—4 hours" may be parsed into a "create new task action" for the "IWB Appliance" product with details that include "iOS syncing" and allocating "4 hours" to the new task. Alternatively, the processing service 130 may be configured or programmed to format the user input request by creating a message that pre-parses the type of task, the product group, the details, and the time to be allocated to the task. In an embodiment, the external data server 150 may send an acknowledgement message stating that the task was created to the processing service 130. The processing service 130 may then notify the client device 130 of the task creation.

4.2. Requests for Information

Examples of a request for information may include, but are not limited to, request for tutorials or specific information related to a specific product, a request for contact information related to a specific person of contact within a specific department or organization, a request for information related to a specific person of interest based upon a desired skillset, and a request for matching product models.

In an embodiment where the user input request is a request for information related to a particular person of contact, a user using the client device 110 may send a user input request such as "Who to call when IWB Appliance 5500 not booting in Campbell, Calif.?" to the request classification and routing system 105. Within the request classification and routing system 105, the request classifier 120 may access the knowledge base 115 to determine classification type matches for the user input request based upon the defined input requests stored in the knowledge base 115. The request classifier 120 may then send the matching classification types, with their confidence scores, to the processing service 130. In this example, the matching classification types determined by the request classifier 120 may be as follows:

| CLASSIFICATION TYPES | CONFIDENCE VALUE |
| --- | --- |
| IWB Appliance Support—Rathna | 0.9997 |
| IWB Appliance Support—Steven | 0.8880 |
| IWB Appliance Support—TJ | 0.5657 |
| IWB Appliance Sales—Tom | 0.0001 |
| IWB Appliance General—Peter | 0.0001 |

After the processing service 130 receives the matching classification types and the associated confidence values, the response type determination service 132 would determine that the classification type "IWB Appliance Support—Rathna" is the top classification type, by virtue of having the highest confidence value. Since the classification type "IWB Appliance Support—Rathna" is a request for information type classification, the response type determination service 132 would conclude that the response type is a request for information. Therefore the input request service 134 may retrieve destination-mapping information for the top relevant classification types that are also requests for information. In this example, the top classification types include "IWB Appliance Support—Rathna", "IWB Appliance Support—Steven", and "IWB Appliance Support—TJ" since their confidence values are sufficiently high, for example, above a threshold of 0.5.

Then the processing service 130 may send the user input request along with the top classification types to the appropriate destination server, which may be data repository 145 that contains employee contact information. In response to receiving the user input request and the classification types, the data repository 145 may send to the processing service 130 relevant contact information related to the classification types. For instance, the data repository may send phone numbers and email addresses for Rathna, Steven, and TJ. Alternatively, the data repository 145 may be configured to directly send the contact information to the client device 110 or the second client device 160. After the processing service 130 receives the contact information, the processing service may format and send the contact information to the client device 110 or the second client device 160.

In another embodiment, the user input request may include a request for information related to an employee based upon a specific technical skillset. In this scenario, the request classification and routing system 105 may classify and route the request to destination servers 140 that maintain information related to qualified employees based upon their skillsets.

In another embodiment, the user input request may include a request for documentation related to a specific product. Similar to the examples above the request classification and routing system 105 may classify and route the request to the appropriate destination servers 140.

In an embodiment, the knowledge base 115 may store classification types that are used to classify input requests based upon product model and product price. For example, the following table may be stored in the knowledge base 115:

| DEFINED INPUT REQUEST | CLASSIFICATION TYPE |
| --- | --- |
| IWB Appliance 21"—10 Users | $2000—IWB Appliance |
| IWB Appliance 27"—15 Users | $2500—IWB Appliance |
| IWB Appliance 55"—20 Users | $6000—IWB Appliance |
| UCS—Basic Model | $2000—UCS |
| UCS—10 Users | $2000—UCS |

In this example, if the user inputs a product search request (request for information), the request classification and routing system 105 will classify and route the user input request to the appropriate destination servers 140, which may include a product data repository that stores product information. The destination servers 140 may then send a result set that includes information on various products based upon the classification type and the user input request. For instance, if the user inputted "Price and specifications for 10 user models", then the user may receive documentation related to products that match classification types "$2000—IWB Appliance" and "$2000—UCS".

5. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
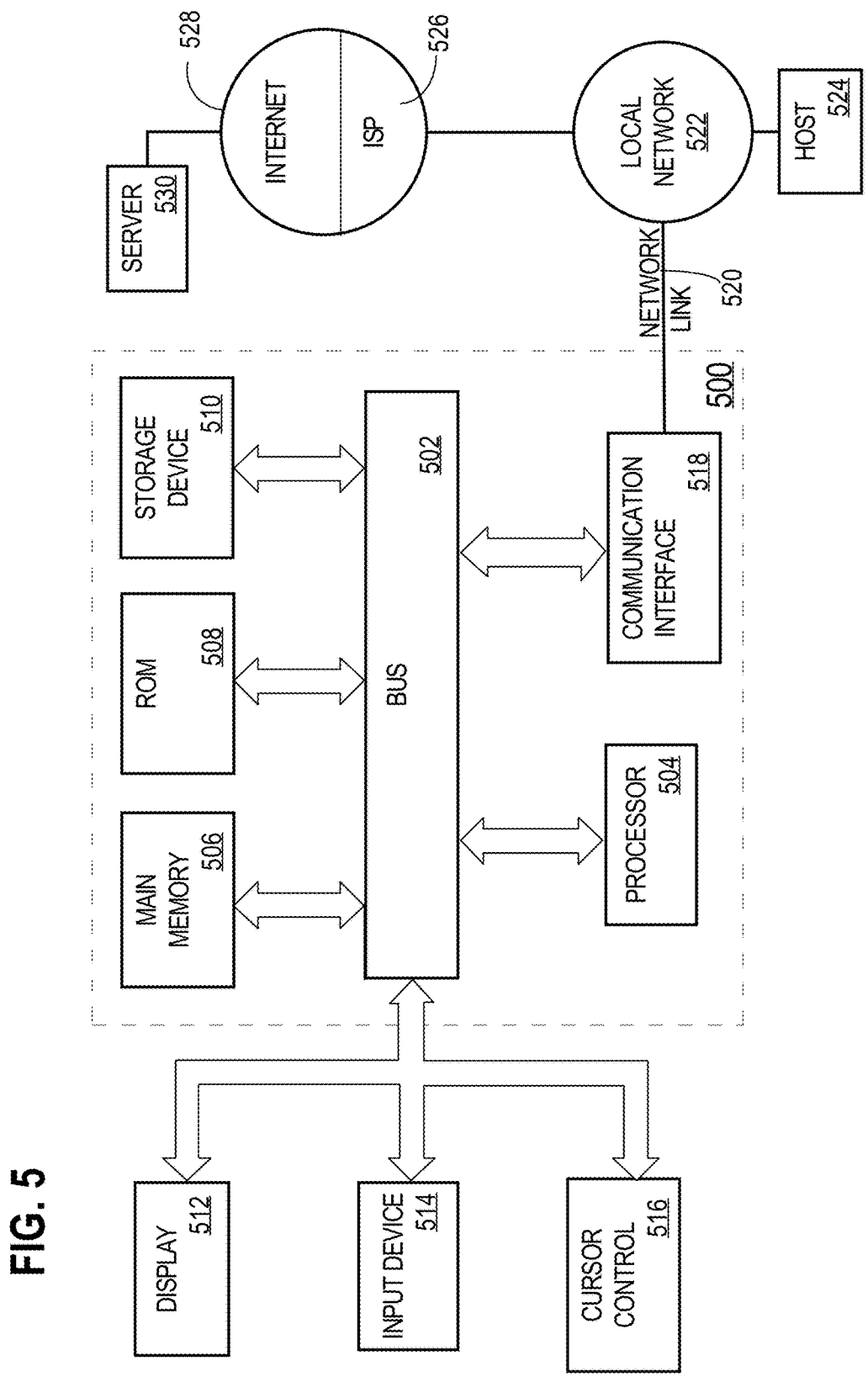
FIG. 5 is a block diagram that depicts an example computer system upon which embodiments may be implemented.

FIG. 5 is a block diagram that depicts an example computer system 500 upon which embodiments may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. Although bus 502 is illustrated as a single bus, bus 502 may comprise one or more buses. For example, bus 502 may include without limitation a control bus by which processor 504 controls other devices within computer system 500, an address bus by which processor 504 specifies memory locations of instructions for execution, or any other type of bus for transferring data or signals between components of computer system 500.

An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic or computer software which, in combination with the computer system, causes or programs computer system 500 to be a special-purpose machine. According to one embodiment, those techniques are performed by computer system 500 in response to processor 504 processing instructions stored in main memory 506. Such instructions may be read into main memory 506 from another non-transitory computer-readable medium, such as storage device 510. Processing of the instructions contained in main memory 506 by processor 504 causes performance of the functionality described herein. In alternative embodiments, hard-wired circuitry may be used in place of or in combination with software instructions to implement the embodiments. Thus, embodiments are not limited to any specific combination of hardware circuitry and software.

The term "non-transitory computer-readable medium" as used herein refers to any non-transitory medium that participates in providing data that causes a computer to operate in a specific manner. In an embodiment implemented using computer system 500, various computer-readable media are involved, for example, in providing instructions to processor 504 for execution. Such media may take many forms, including but not limited to, non-volatile and volatile non-transitory media. Non-volatile non-transitory media includes, for example, optical or magnetic disks, such as storage device 510. Volatile non-transitory media includes dynamic memory, such as main memory 506. Common forms of non-transitory computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of non-transitory computer-readable media may be involved in storing instructions for processing by processor 504. For example, the instructions may initially be stored on a storage medium of a remote computer and transmitted to computer system 500 via one or more communications links. Bus 502 carries the data to main memory 506, from which processor 504 retrieves and processes the instructions. The instructions received by main memory 506 may optionally be stored on storage device 510 either before or after processing by processor 504.

Computer system 500 also includes a communication interface 518 coupled to bus 502. Communication interface 518 provides a communications coupling to a network link 520 that is connected to a local network 522. For example, communication interface 518 may be a modem to provide a data communication connection to a telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be processed by processor 504 as it is received, and/or stored in storage device 510, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
   one or more processors; and
   one or more memories storing instructions which, when processed by one or more processors, cause:
   a request classifier service, executing on a server computer, to:

receive an input request from a client device;
access classification data from a knowledge repository, wherein the classification data comprises one or more defined input requests mapped to one or more classification types;
determine confidence values for each of the one or more defined input requests mapped to the one or more classification types, wherein each confidence value represents a relative match score between the input request from the client device and one of the one or more defined input requests mapped to the one or more classification types;
determine, based upon the confidence values for each of the one or more defined input requests mapped to the one or more classification types, one or more best matching defined input requests that best match the input request from the client device, and
send one or more classification types for the one or more best matching defined input requests that best match the input request received from the client device to a processing service on the server computer;
the processing service to:
determine a process response type, based upon the one or more classification types for the one or more best matching defined input requests that best match the input request received from the client device;
determine, based upon a classification type of the process response type and mapping information that maps destinations to classification types, a destination for the process response type, and
route both the process response type, determined by the processing service based upon the one or more classification types for the one or more best matching defined input requests that best match the input request received from the client device, and the input request from the client device to the destination for the process response type.

2. The apparatus of claim 1, wherein determining a process response type, based upon the one or more classification types for the one or more best matching defined input requests that best match the input request from the client device further comprises evaluating a process response type for each of the one or more best matching defined input requests.

3. The apparatus of claim 1, wherein routing both the process response type, determined by the processing service, and the input request from the client device to a destination mapped to the process response type further comprises transforming the input request from the client device into a specific transformed request based upon the destination mapped to the process response type.

4. The apparatus of claim 3, wherein the destination mapped to the process response type is a location on a support ticket server and the specific transformed request is one or more of a Short Message Service (SMS) message, a voice message, or an Interactive Voice Response (IVR) message.

5. The apparatus of claim 3, wherein the destination mapped to the process response type is a location on a database server used to allocate data tasks, wherein the specific transformed request is formatted to a database entry that represents allocating data tasks.

6. The apparatus of claim 1, wherein the one or more memories storing instructions which, when processed by the one or more processors, further cause:
the processing service, sending an acknowledgement message to the client device, wherein the acknowledge message includes information related to the process response type and the destination mapped to the process response type.

7. The apparatus of claim 6, wherein the one or more memories storing instructions which, when processed by the one or more processors, further cause:
the processing service, sending a second acknowledgement message to a second client device associated with the client device, wherein the second acknowledge message includes information related to the process response type and the destination mapped to the process response type.

8. One or more non-transitory computer-readable media storing instructions, which, when processed by one or more processors, cause:
a request classifier service, executing on a server computer, to:
receive an input request from a client device;
access classification data from a knowledge repository, wherein the classification data comprises one or more defined input requests mapped to one or more classification types;
determine confidence values for each of the one or more defined input requests mapped to the one or more classification types, wherein each confidence value represents a relative match score between the input request from the client device and one of the one or more defined input requests mapped to the one or more classification types;
determine, based upon the confidence values for each of the one or more defined input requests mapped to the one or more classification types, one or more best matching defined input requests that best match the input request from the client device, and
send one or more classification types for the one or more best matching defined input requests that best match the input request received from the client device to a processing service on the server computer;
the processing service to:
determine a process response type, based upon the one or more classification types for the one or more best matching defined input requests that best match the input request received from the client device;
determine, based upon a classification type of the process response type and mapping information that maps destinations to classification types, a destination for the process response type; and
route both the process response type, determined by the processing service based upon the one or more classification types for the one or more best matching defined input requests that best match the input request from the client device, and the input request received from the client device to a destination for the process response type.

9. The one or more non-transitory computer-readable media of claim 8, wherein determining a process response type, based upon the one or more classification types for the one or more best matching defined input requests that best match the input request from the client device further comprises evaluating a process response type for each of the one or more best matching defined input requests.

10. The one or more non-transitory computer-readable media of claim 8, wherein routing both the process response type, determined by the processing service, and the input request from the client device to a destination mapped to the process response type further comprises transforming the input request from the client device into a specific transformed request based upon the destination mapped to the process response type.

11. The one or more non-transitory computer-readable media of claim 10, wherein the destination mapped to the process response type is a location on a support ticket server and the specific transformed request is one or more of a Short Message Service (SMS) message, a voice message, or an Interactive Voice Response (IVR) message.

12. The one or more non-transitory computer-readable media of claim 10, wherein the destination mapped to the process response type is a location on a database server used to allocate data tasks, wherein the specific transformed request is formatted to a database entry that represents allocating data tasks.

13. The one or more non-transitory computer-readable media of claim 8, further comprising storing instructions, which, when processed by the one or more processors, cause:

the processing service, sending an acknowledgement message to the client device, wherein the acknowledge message includes information related to the process response type and the destination mapped to the process response type.

14. The one or more non-transitory computer-readable media of claim 13, further comprising storing instructions, which, when processed by the one or more processors, cause:

the processing service, sending a second acknowledgement message to a second client device associated with the client device, wherein the second acknowledge message includes information related to the process response type and the destination mapped to the process response type.

15. A computer-implemented method comprising:

a request classifier service, executing on a server computer, receiving an input request from a client device;

accessing, by the request classifier service, classification data from a knowledge repository, wherein the classification data comprises one or more defined input requests mapped to one or more classification types;

determining, by the request classifier service, confidence values for each of the one or more defined input requests mapped to the one or more classification types, wherein each confidence value represents a relative match score between the input request from the client device and one of the one or more defined input requests mapped to the one or more classification types;

determining, by the request classifier service, based upon the confidence values for each of the one or more defined input requests mapped to the one or more classification types, one or more best matching defined input requests that best match the input request from the client device, and sending, by the request classifier service, one or more classification types for the one or more best matching defined input requests that best match the input request received from the client device to a processing service on the server computer;

determining, by the processing service, a process response type based upon the one or more classification types for the one or more best matching defined input requests that best match the input request received from the client device;

determining, by the processing service based upon a classification type of the process response type and mapping information that maps destinations to classification types, a destination for the process response type; and routing, by the processing service, both the process response type, determined by the processing service based upon the one or more classification types for the one or more best matching defined input requests that best match the input request received from the client device, and the input request from the client device to a destination for the process response type.

16. The method of claim 15, wherein determining a process response type, based upon the one or more classification types for the one or more best matching defined input requests that best match the input request from the client device further comprises evaluating a process response type for each of the one or more best matching defined input requests.

17. The method of claim 15, wherein routing both the process response type, determined by the processing service, and the input request from the client device to a destination mapped to the process response type further comprises transforming the input request from the client device into a specific transformed request based upon the destination mapped to the process response type.

18. The method of claim 17, wherein the destination mapped to the process response type is a location on a support ticket server and the specific transformed request is one or more of a Short Message Service (SMS) message, a voice message, or an Interactive Voice Response (IVR) message.

19. The method of claim 17, wherein the destination mapped to the process response type is a location on a database server used to allocate data tasks, wherein the specific transformed request is formatted to a database entry that represents allocating data tasks.

20. The method of claim 15, further comprising the processing service, sending an acknowledgement message to the client device, wherein the acknowledge message includes information related to the process response type and the destination mapped to the process response type.

* * * * *